United States Patent [19]
Stricklin et al.

[11] Patent Number: 5,816,298
[45] Date of Patent: Oct. 6, 1998

[54] TWO-PART FLUID COUPLING WITH GUIDE STRUCTURE

[75] Inventors: Douglas K. Stricklin, Brea; Chester Savage, Irvine, both of Calif.

[73] Assignee: Scholle Corporation, Irvine, Calif.

[21] Appl. No.: 740,649

[22] Filed: Oct. 31, 1996

Related U.S. Application Data

[63] Continuation-in-part of Ser. No. 499,291, Jul. 7, 1995, Pat. No. 5,609,195, which is a continuation-in-part of Ser. No. 240,978, May 10, 1994, Pat. No. 5,467,806.

[51] Int. Cl.$^6$ .................................................. F16L 37/28
[52] U.S. Cl. ...................... 141/346; 141/351; 251/149.6; 137/614.04
[58] Field of Search ................ 141/10, 346, 351–355; 251/149.6; 137/614.04

[56] References Cited

U.S. PATENT DOCUMENTS

| | | | |
|---|---|---|---|
| 3,417,781 | 12/1968 | Gregg | 137/614.04 |
| 4,421,146 | 12/1983 | Bond et al. | 141/349 |
| 5,095,962 | 3/1992 | Lloyd-Davies | 141/346 |
| 5,186,224 | 2/1993 | Schirmacher | 141/346 |
| 5,301,723 | 4/1994 | Goode | 141/346 |
| 5,337,782 | 8/1994 | Wilcox | 51/149.6 |

FOREIGN PATENT DOCUMENTS

883047508  5/1988  European Pat. Off. .

*Primary Examiner*—J. Casimer Jacyna
*Attorney, Agent, or Firm*—Oppenheimer Poms Smith

[57] ABSTRACT

A two-part coupling structure includes a male coupling part and a female coupling part which are mutually engageable to open fluid communication between a fluid-storage vessel and a conduit, for example. The coupling parts are disengageable from one another to discontinue fluid communication between the vessel and the conduit, and also to close communication between ambient and each of the vessel and conduit. The retention volume of fluid which is trapped between the connected male and female coupling parts and which is exposed to or lost to ambient when the coupling parts are disconnected is very small. The male coupling part is carried in a guide structure which is removably engageable with the female coupling part to guide the male coupling part into engagement. Also, the male coupling part and its guide structure define cooperating structural features which effect opening of the male coupling part in response to advancement relative to the guide structure. Consequently, the male coupling part can be opened without being connected to a female coupling part, for example, for cleaning and inspection, as well as for replacement of a sealing member.

12 Claims, 7 Drawing Sheets

TWO-PART FLUID COUPLING WITH GUIDE STRUCTURE

CROSS REFERENCE TO RELATED APPLICATIONS

The present application is a Continuation-in-Part of U.S. application Ser. No. 08/499,291, filed 7 July 1995, now U.S. Pat. No. 5,609,195, which is a Continuation-in-Part of United States application No. 08/240,978, filed 10 May 1994, now U.S. Pat. No. 5,467,806, both having the same assignee as the present application, and both being incorporated herein by reference to the extent necessary for a complete disclosure of the present invention.

BACKGROUND OF THE INVENTION

FIELD OF THE INVENTION

The present invention is in the field of fluid-flow couplings which are generally characterized as being of the "dry break" type. More particularly, the present invention relates to fluid-flow couplings which include a first (or male) part, and a second (or female) part which when connected to one another effect fluid-flow communication therebetween. When the coupling parts are connected they may be used to effect fluid-flow communication between a vessel and a conduit, for example. When the coupling parts are disconnected they mutually reseal so that fluid is not lost either from the conduit or from the vessel. Additionally, the "dry break" aspect of these couplings means that each coupling part desirably has a minimal retention volume of fluid, which fluid is not sealed either in the male or female coupling part upon disconnection, and which is thus released into or exposed to ambient conditions. Further, the present invention relates to such couplings which additionally have a guide structure removably supporting on one of the coupling parts, and guiding the other coupling part reciprocally for engagement and disengagement with the one coupling part.

RELATED TECHNOLOGY

A conventional coupling structure is known in accord with U.S. Pat. No. 4,421,146 (the '146 patent), issued 20 Dec. 1983 to Curtis J. Bond, et al. A coupling structure according to the '146 patent includes a tubular spout attached to and in fluid communication with a fluid filled vessel, such as a bag held within a cardboard box. This spout portion includes a plug member which is axially moveable between a first position closing fluid communication between the vessel and an outer portion of the spout member, and a second position opening this fluid communication. In the second position of the plug member a pair of lateral openings at an inner portion of the plug member are moved inwardly of the spout to permit fluid communication between the vessel and the outer portion of the spout.

A service member (i.e., the male coupling part) is carried in a guide structure which clamps to the spout and guides the service member for axial sliding engagement into sealing relation with the spout. The service member provides communication with a conduit, and includes a valve member closing communication between the conduit and ambient when the service member is disconnected from the spout. The service member as it engages the spout is also engageable with the plug member to move it between its two positions, and engagement between the service member and plug member opens the valve in the service member. Thus, when the service member is engaged into the spout, communication between the vessel and the conduit is established. Further, it is seen that the plug member of the '146 patent carries an axial projection which contacts the valve member of the service member (the male coupling part), and opens this valve member.

When the service member and spout member of the coupling according to the '146 patent are axially disengaged from one another, a small volume of fluid is retained outwardly of the valve member and spout. This retention volume of fluid is small because the service member defines a domed end surface, and the plug member has a matching contoured end wall closely fitting to the valve member. The lateral ports of the plug member are themselves of small volume, and the passage leading to the plug member is small and is mostly filled by the plug valve member itself when this member is moved to its closed position.

A disadvantage of the coupling structure according to the '146 patent is that the cross sectional passage area available for fluid flow through the connected parts of the coupling is small. Consequently, fluids will flow through this coupling, but only at what ever rate is allowed by the relatively small cross sectional flow area of the coupling and the viscosity of the fluid. Further, semi-liquids, such as salad dressings with chunky food particles and condiments like pickle relish, will not effectively flow through this coupling.

Also, the guide structure carrying the service member of the 146' patent engages the spout only in response to a lateral movement bringing the service member into axial alignment with the spout. This lateral movement inter-fits the guide structure at a yoke portion thereof between a pair of axially spaced apart flanges on the spout. After this lateral movement, axial relative movement of the service member relative to the guide structure and into the spout can effect connection of the two parts of the coupling structure. However, the combination of guide structure and service member is not ergonomically configured to allow convenient manual connection with the spout. Consequently, users of such fittings have a tendency to simply push on the service member or its attached hoses or conduits in order to effect its engagement with the spout. This forceful pushing by the user may transfer too much force to the container so that the spout is dislodged from its desired location on the container.

Further, some users of such fittings may prefer an engagement action between a coupling structure and a dispenser container which is different than the lateral movement required for the coupling according to the '146 patent. The coupling structure according to the '146 patent does not allow for alternative engagement movements or actions.

Still further, the service member of the '146 patent cannot be conveniently opened for cleaning, inspection, or replacement of the sealing member therein. It is true that the service member can be disassembled manually, but this service member contains many parts and disassembly is a messy job after the service member has been used to convey a food product. Consequently, these service members are sometimes discarded when a simple cleaning or replacement of an O-ring seal would allow their continued use. However, because the service member according to the '146 patent cannot be conveniently cleaned or fitted with a new O-ring, many users simply throw the fitting away and purchase a new one.

Another conventional coupling, which may be considered to be of hermaphrodite configuration, is known from European patent application No. 0 294 095 A1, published 7 Dec. 1988 (the '095 application). According to the '095 application, a "male" and "female" coupling parts are brought into alignment and juxtaposition by a yoke carried on a guide housing. The male coupling part is configured as a tubular member which is axially movable by a handle on the guide housing to engage with an annular valve member carried in the female coupling part. When the male and female coupling parts are coupled with one another (i.e., by extension of the male coupling part relative to the guide housing and into the female coupling part), an inner liquid extraction flow path is separated from an outer air-entrance (or pressurized gas delivery) flow path by the annular valve member of the female coupling. In the coupled condition of the male and female couplings, the annular valve member of the female coupling part also serves as a sealing member. A version of this coupling is also known in which the male coupling part carries a spring-loaded internal disk valve member which closes the liquid extraction flow path of the male coupling part when the male and female coupling parts are not coupled with one another.

SUMMARY OF THE INVENTION

In view of the deficiencies of the related technology it is an object for this invention to avoid one or more of these deficiencies.

In view of the deficiencies of the related technology, it can be seen that a need exists for a coupling structure which allows engagement of a male and female coupling parts with a minimum of engagement force being transferred to a container carrying the female coupling part.

Still further, a need exists for such a coupling structure which is of low or zero retained volume when the components of the coupling are disconnected from one another.

Further, a need exists for such a coupling structure which allows for alternative engagement actions or motions between a guide structure and the container carrying a spout.

Additionally, a need can be seen to exist in view of the related technology for such a coupling structure which allows the male coupling part to be opened for inspection, cleaning, and service (such as replacement of an O-ring sealing member) without being attached to a female coupling part.

An additional object for this invention is to provide a coupling structure which will function properly with a fluid having pieces, chunks, or particles in the fluid.

Accordingly the present invention provides a fluid coupling structure having a female coupling portion and a male coupling portion each defining a respective fluid flow path, the coupling portions being removably engageable with one another to communicate the respective fluid flow paths with one another, each coupling portion including an individual valve element having a respective closed first position, the valve elements moving to respective open second positions when the coupling portions are engaged together, the coupling structure comprising: a guide structure reciprocably carrying the male coupling portion, the guide structure including support structure for supporting on the female coupling portion, and the guide structure also including guiding structure for guiding the male coupling portion in reciprocation into and from the female coupling portion, the guide structure and male coupling portion including cooperating structure for opening the respective valve member of the male coupling portion in response to reciprocation of the male coupling portion relative to the guide structure as though it were moving toward engagement with a female coupling portion.

According to another aspect, the present invention provides a male fluid coupling device for use in conjunction with a female fluid coupling device, the male fluid coupling device defining a fluid flow path, the male and female fluid coupling devices being removably engageable with one another to communicate the fluid flow path with another fluid flow path defined within the female coupling device, the male fluid coupling device being carried reciprocably within a guide structure which supports upon the female coupling device, the male coupling device also comprising a valve element having a closed first position and relatively moving to a open second position in response to reciprocation of the male coupling device relative to the guide structure as though the male coupling device were moving toward engagement with a female coupling device.

An advantage of the present invention is that the male coupling part can be opened for cleaning and inspection without the need to disassemble this male coupling part. Moreover, the male coupling part does not rely upon its being coupled with a female coupling part to effect this opening of the flow path through the male coupling part. Instead, relative axial movement of the guide structure and male coupling part is effective to open the male coupling part.

These and additional objects and advantages of the present invention will be apparent from a reading of the following detailed description of an exemplary preferred embodiment of the invention taken in conjunction with the appended drawing Figures, which are described briefly immediately below.

BRIEF DESCRIPTION OF THE DRAWING FIGURES

FIG. 1 provides a perspective view of a fluid dispensing system, including a fluid-holding vessel and a fluid conduit, preparatory to communication with one another by use of a coupling structure embodying the present invention. FIG. 1 is presented in somewhat of a schematic form with part of the vessel being broken away for greater economy of illustration;

DETAILED DESCRIPTION OF EXEMPLARY PREFERRED EMBODIMENT OF THE INVENTION

An overview

Figure 1:
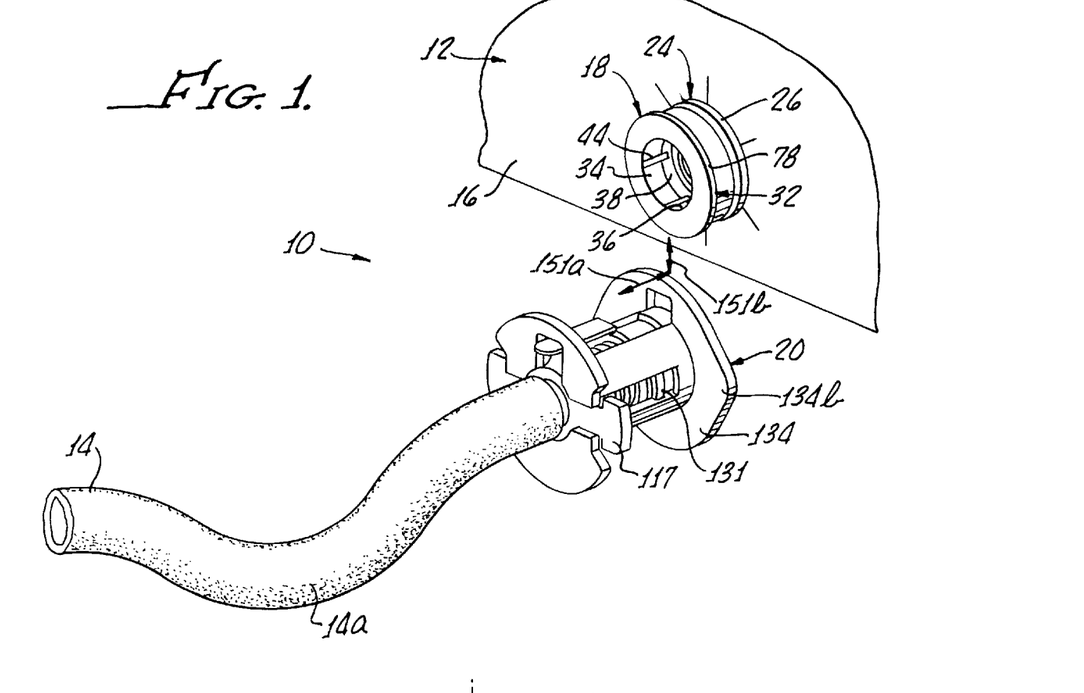

Keeping in mind the disclosure of the parent patents referenced above and viewing FIG. 1, a liquid dispensing system 10 is schematically depicted. This dispensing system 10 includes a liquid-holding vessel 12, which may be communicated with a conduit 14 by use of a two-part coupling structure to be further described below. The vessel 12 may be of any desired construction, but the illustrated vessel is of the bag-in-box configuration. It will be understood that the invention is in no way limited to use of a bag-in-box type of vessel. For example, it will be seen that a cap portion of the female coupling structure (to be described below) can be fitted onto the mouth of a bottle, and would then work as described below to establish fluid communication with the bottle.

Figure 2:
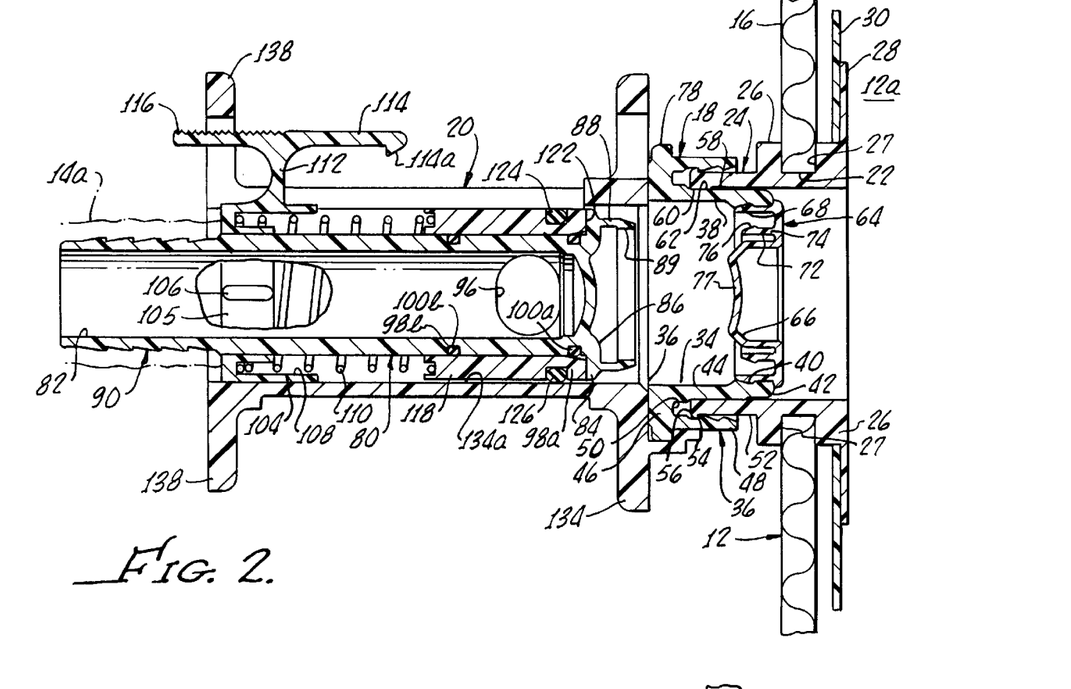
FIG. 2 is an enlarged longitudinal cross sectional view of a coupling according to an exemplary preferred embodiment of the present invention preparatory to coupling of male and female portions of the coupling structure.
Figure 3:
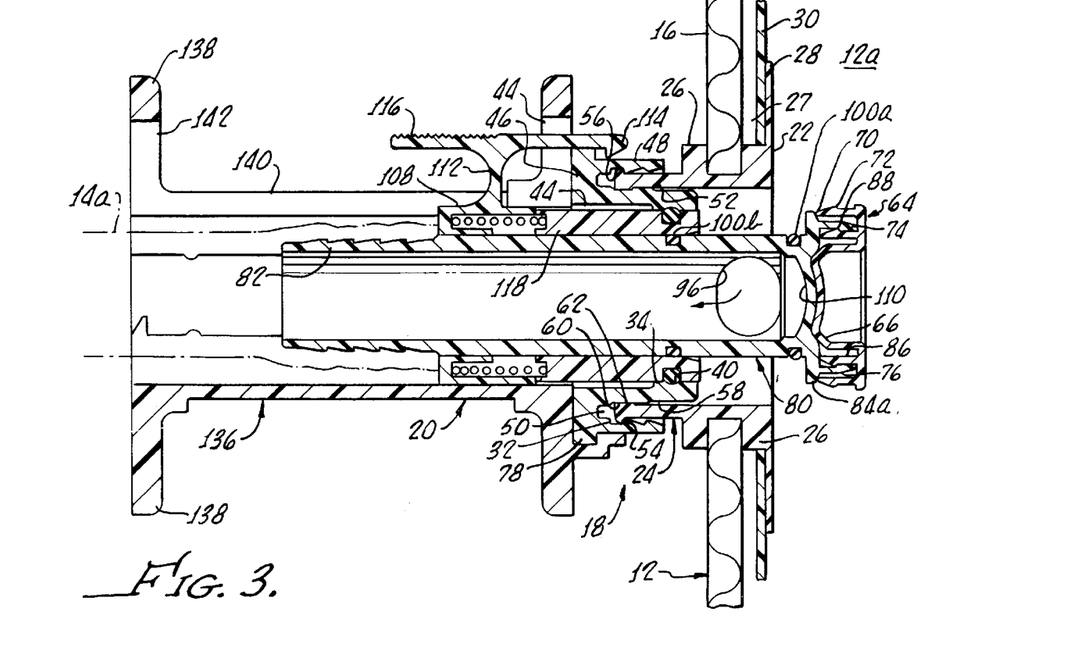
FIG. 3 is an enlarged longitudinal cross sectional view similar to FIG. 2, and showing the male and female coupling portions coupled with one another to establish fluid communication between the vessel and conduit.

The bag-in-box vessel 12 includes an outer shape-retaining box 16 of corrugated paperboard, and an inner flexible bag (not visible in FIG. 1), which is generally fabricated of plastic sheet. As FIGS. 2 and 3 illustrate, the vessel 12 includes a female coupling portion 18, in this case including a bag fitment member sealed on the plastic bag, a cap member, and a plug member. The female coupling portion 18 closes access to the liquid contents of the vessel 12 until a male coupling portion 20, in this case including a probe, and a guide structure, is connected with the female coupling portion 18. The engagement of the male coupling portion 20 and female coupling portion 18 provides fluid-flow communication between the vessel 12 and the conduit 14. It will further be understood that the fluid communication established between the conduit 14 and the interior of the vessel 12 (i.e., to the interior chamber 12a of the bag within box 16) can alternatively be used both to flow liquid into and from the vessel 12.

Preferably, each of the female and male coupling portions (18 and 20, respectively) is principally fabricated of a somewhat yieldable, but generally shape-retaining polymer material (i.e., each coupling portion is preferably formed from molded plastic). As those ordinarily skilled in the pertinent arts will appreciate, the components of the coupling portions 18 and 20 may be made by an injection molding process. This method of fabricating the components of the coupling portions has the advantage of making the couplings of such low cost that the female coupling portion 18 may be thrown away with a disposable bag-in-box container, as well as being thrown away with other types of containers which are not recycled. Alternatively, when used with a reusable or recyclable container, such as one of glass or durable plastic, the container is cleaned, refilled, and reused. However, the female coupling portion 18 is of such low cost that it may be discarded for sanitation reasons. Thus, in such a case, the used female coupling portion 18 may be discarded and a new female coupling portion is placed on the cleaned and refilled container.

On the other hand, the male coupling portion 20 is durable and is useable during its service life over a considerable period of time and with several different female coupling portions 18 on several successive vessels 12 for dispensing the liquid contents of these vessels. As will be seen, the male coupling portion 20 may be opened for cleaning without being connected to a female coupling portion 18 or to a vessel 12. Further, the male coupling portion 20 may also be manually opened for inspection and for possible replacement of an internal sealing member (i.e., an O-ring type seal), also without its being connected to a female coupling portion. As will be seen, the male coupling portion 20 may be entirely disassembled manually if necessary for cleaning and replacement of seals. However, because the male coupling portion allows access for cleaning, inspection, and for possible replacement of an internal O-ring seal without disassembly of the coupling portion, it is anticipated that users of such couplings will not have to disassemble the male coupling portion during its useful life.

FIGS. 2 and 3 show that the paperboard box 16 defines a hole 22 into which the female coupling portion 18 is retained. Those ordinarily skilled in the pertinent arts will appreciate that it is conventional to form this hole in a "keyhole" shape, or to provide several radial slits in the cardboard so that movable tab portions are formed surrounding the hole 22. It is understood that such tabs serve to grasp the female coupling portion 18 when this portion is pulled outwardly through the hole 22 from within the box 16. The use of a "keyhole" shaped hole in the box 16 to hold the female coupling portion 18 will also be familiar to those ordinarily skilled. Thus, the female coupling portion 18 is inserted into and is locked in place within the hole 22 with a portion of this female coupling extending outwardly of the box 16.

Further viewing FIGS. 2 and 3, it is seen that this interlocking of the female coupling portion 18 with the box 12 is achieved by a bag fitment member 24, which is a part of the female coupling portion 18 in this instant case of a bag-in-box vessel. Other types of vessels may not require a bag fitment member, as will be appreciated. The bag fitment member 24 defines a pair of spaced apart and radially outwardly extending flange portions 26 which cooperate in forming a circumferential groove 27. The flanges 26 are trapped one inside and one outside of the box 16 at the hole 22, with the corrugated paperboard material of the cardboard box around hole 22 being received into the groove 27.

Inwardly of the box 16, the bag fitment member 24 includes a comparatively thin inner flange portion 28. This inner flange portion 28 is carried by the inner one of the flanges 26, and is of a greater radial extent than this inner flange 26. The bag actually forming the liquid-holding chamber of vessel 12 (which chamber has been referenced with the numeral 12a), is closed except for the access provided by fitment member 24, and is only fragmentary seen in FIGS. 2 and 3. The portion of this plastic bag illustrated in the drawing Figures is referenced with the numeral 30. This plastic bag is conventionally formed of thermoplastic sheet material having a hole formed in the sheet material for receipt of the bag fitment member 24. The bag fitment member 24 is conventionally received from within the bag 30 (i.e., before the bag is completely closed) outwardly through this hole in the bag, and is secured by heat sealing of the flange portion 28 at a marginal portion of the plastic sheeting around the hole in the bag. Thus, it is seen that the liquid contents of the bag have fluid communication with the female coupling portion 18 via the bag fitment member 24.

Again, those ordinarily skilled will recognize that the bag fitment member 24 may be considered analogous to the mouth of a bottle, and that the female coupling portion 18 (including the cap and plug components, but not including a bag fitment) can be installed on such a bottle mouth.

Female Coupling Portion 18

A portion of the bag fitment member 24 extends outwardly of the box 16 to sealingly hold a cap member 32, which is an operative portion of the female coupling portion 18 in this case. In a case where the cap member 32 is installed on a bottle or other container, for example, then the bag fitment member 26 of the female. coupling portion 18 would not be needed, as explained above, and as is easily understood.

Returning to a consideration of FIGS. 2 and 3, it is seen that this cap member 32 defines a circular through bore 34, which includes an entrance section 36 of slight conical taper, and a cylindrical section 38 of constant diameter. Near the inner end of bore portion 38 is defined a radially inwardly disposed circumferential groove 40. Several elongate venting grooves 44 extend along the inner surface of the bore 34.

FIGS. 2 and 3 also show that the cap member 32 includes a circumferentially extending radially and axially thickened portion 46 from which rearwardly (i.e., toward the box 16) extends a circumferential skirt portion 48. The skirt portion 48 cooperates with the remainder of cap member 32 to define an axially extending annular recess 50. A tubular neck portion 52 of the bag fitment member 24 is sealingly and captively receivable into the recess 50 as will be seen.

In order to provide sealing and captive receipt of the neck portion 52 into the recess 50, the neck portion 52 is provided with a radially outwardly extending circumferential ridge 54. This ridge 54 will be seen to be analogous to the outer ridge usually provided around the mouth of many glass and plastic bottles. The skirt portion 48 defines a radially inwardly opening recess 56 receiving the ridge 54. Further, a radially outer surface 58 of the cap member 32 provides a radially outwardly opening recess 60, and the neck portion 52 provides a radially inwardly extending ridge 62 which is received into the recess 60. Thus, an additional security of retention of the cap 32 on neck 52 is by the engagement of ridge 62 into groove 60. This extra security of retention is important in view of the fact that these components (fitment and cap member) are fabricated of shape-retaining, but somewhat yieldable plastics. In a case where the cap 32 is received on the neck of a rigid glass bottle, for example, an inner ridge 62 will likely not be present on the bottle. However, the greater rigidity of the glass material makes such an inner ridge unnecessary, and a secure retention of the cap member 32 is achieved by receipt of the bottle neck ridge in groove 56.

Further considering the cap member 32, it is seen that the bore 34 is closed by a removable plug member 64. This plug member 64 is removably carried within the cap member 32 and is of generally disk-like configuration. This plug member 64 includes a wall portion 66, which closes the bore 34 of the cap member 32 in the operative position of the plug member 64 depicted in FIG. 2. As can be seen viewing FIGS. 2 and 3, the plug member 64 includes an axially extending outer ring portion 68, which engages into the cap member 32, and which includes an outwardly extending circumferential ridge 70 (best seen in FIG. 3) received into the groove 40. The ridge 70 is formed by the cooperation of a forward taper surface and a rearward taper surface (not individually referenced in the drawing Figures), which surfaces may have differing angles of taper, as will be appreciated in view of one of the parent patents referenced above. Such may also be the case with respect to the surfaces of cap member 32 defining the groove 40 (these surfaces also not being individually referenced in the drawing Figures). Accordingly, it will be understood that respectively differing levels of axial force may be required to engage the plug member 64 into the cap member 32, and to disengage from the plug member 64 from the cap member 32.

Still viewing FIGS. 2 and 3, it is seen that spaced radially inwardly of the ring portion 68, the plug member 64 includes a second ring portion 72. This second ring portion 72 radially outwardly defines a radially outwardly opening groove 74 and a radially outwardly extending ridge 76. As will be appreciated in view of the parent patents referenced above, the ridge 76 may also include oppositely axially extending taper surfaces (not individually, referenced on the drawing Figures) so that respectively different engagement and disengagement forces can be effected when the plug member 32 is engage by and disengaged from the male coupling portion 20, as will be more fully explained below. Within the inner ring 72, the plug member 64 defines an axially extending protrusion 77. As is seen in FIG. 3, and as will be further explained below, the protrusion 77 substantially fills a recess on the forward end of the male coupling portion 20 when the plug member 64 is engaged with and carried by this male coupling portion.

Further considering the cap member 32, it is seen that this cap member at an end distally remote from the box 12 defines a radially outwardly extending circumferential flange portion 78. In the present embodiment, the flange portion 78 is circumferentially continuous, and provides purchase for a guide structure carrying other parts of the male coupling portion 20 in order to allow these to engage with and be supported from the female coupling portion 18. As will be seen below, according to the instant embodiment of the invention the flange portion 78 is straddled by a semi-circular yoke (referenced below) on a guide structure (also referenced below) for the male coupling portion 20. As will be seen, alternative embodiments of the present invention utilize other ways for obtaining purchase on the cap member 32.

Male Coupling Portion 20

Figure 4:
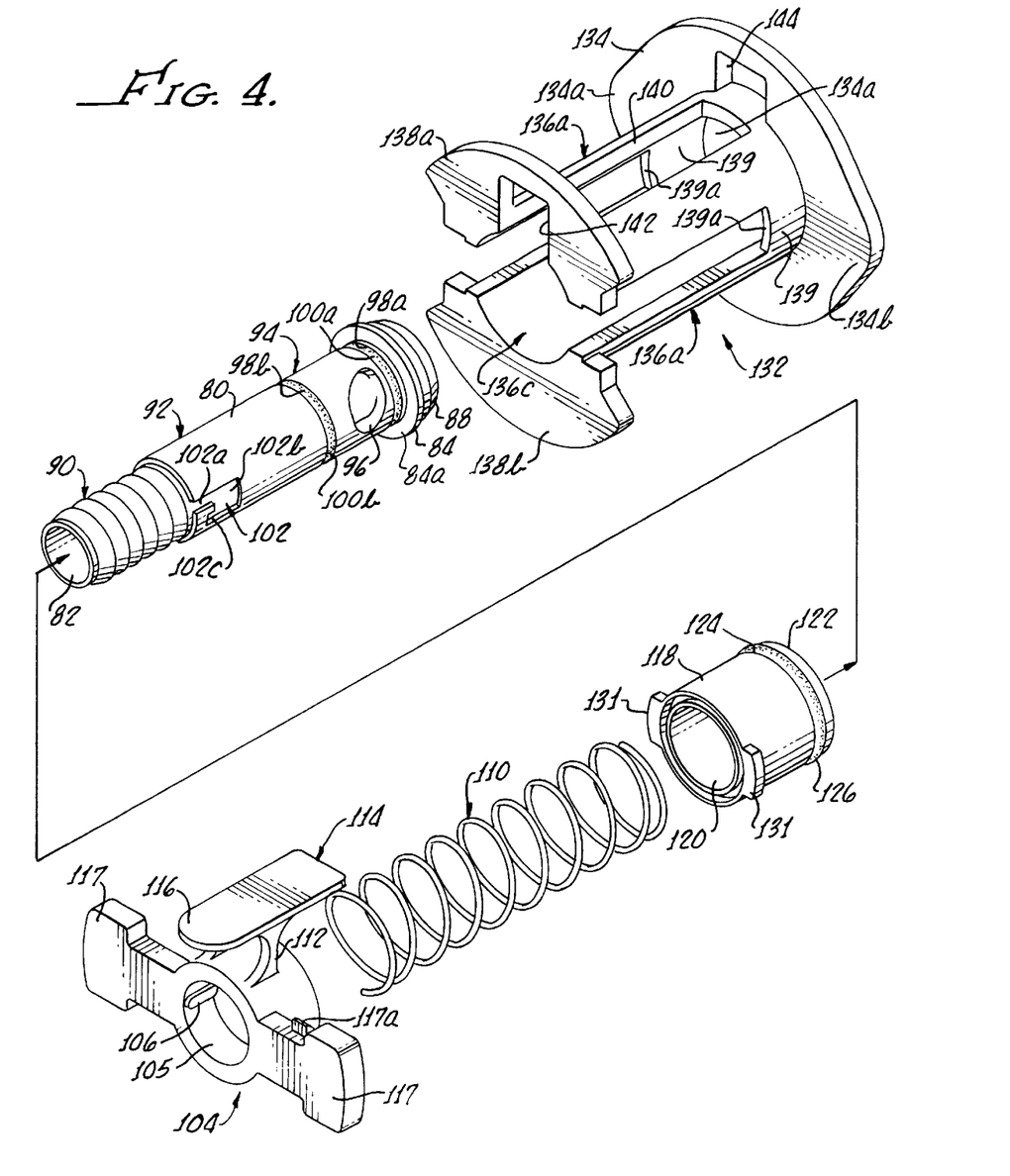
FIG. 4 provides an exploded perspective view of a male coupling portion and guide structure according to the present invention.
Figure 5:
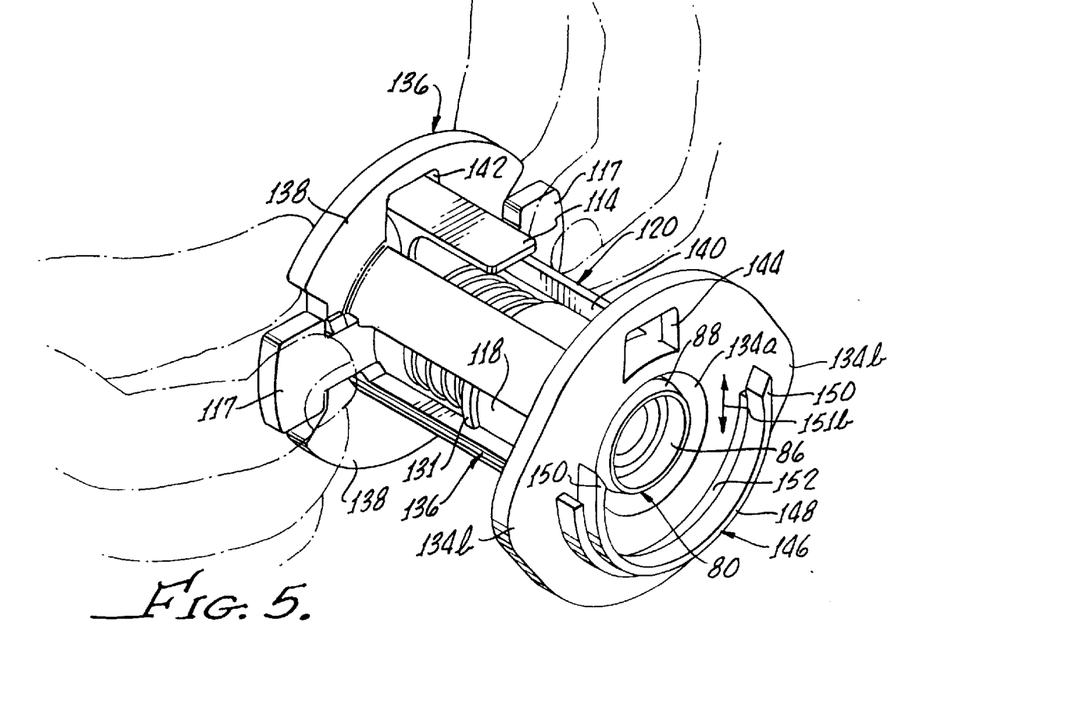
FIG. 5 is a perspective view of the male coupling portion with guide structure, and shows a yoke portion of the guide structure for supporting and guiding the male coupling portion from the female coupling portion according to the present invention.

Turning now to FIGS. 4 and 5, and keeping FIGS. 1–3 in view, it is seen that this male coupling portion 20 includes a tubular probe member 80. The probe member 80 defines an axial blind passage 82 extending nearly through the probe member, and is surrounded at one end (as is best seen in FIG. 4) by a radially thickened portion or flange 84 on which is defined an annular axially extending recess 86 (best seen in FIGS. 2, 3, and 5) within an axially extending ring portion 88. The thickened portion 84 defines an annular shoulder 84a disposed toward the opposite end of the probe member 80. The ring portion 88 carries a radially inwardly disposed ridge 89 (best seen in FIG. 2). At the opposite end (i.e., away from the viewer of FIG. 5, and best seen in the exploded perspective view of FIG. 4), the probe member 80 outwardly defines a hose barb section 90 for connection with a flexible hose 14a defining at least a portion of the conduit 14. The flexible hose section 14a provides freedom of movement for the coupling portion 20.

Viewing FIG. 4, it is seen that forwardly of the hose barb section 90, the probe member 80 includes a slightly larger diameter cylindrical section 92 leading to an adjacent cylindrical section 94 of substantially the same diameter and which extends all the way to the portion 84 (i.e., to shoulder 84a). Adjacent to the portion 84, the section 92 defines a pair of diametrically opposed openings 96 communicating the passage 82 outwardly on the probe member 80. Distally of the openings 96 (that is, toward the forward end of the probe member 80, which is toward the right-hand end of this probe member as seen by a viewer of FIG. 4), the probe member 80 defines a first annular groove 98a between the openings 96 and the adjacent shoulder 84a. In the groove 98a is fitted an O-ring type of sealing member 100a. On the opposite side of the openings 96, the probe member 80 defines a second annular groove 98b into which is fitted a second O-ring type of sealing member 100b.

Probe member 80 at section 92 also defines a pair of diametrically opposite and like J-shaped grooves 102 (only one of which is seen in FIG. 4). These J-shaped grooves 102 have a longer leg 102a extending axially on portion 92 from an open end adjacent to hose barb section 90. A portion 102b of the J-shaped grooves 102 extends circumferentially on probe portion 92, and a short (and closed) leg 102c of the J-shaped groove 102 extends on portion 92 back toward but short of section 90 of the probe member.

Removably carried on the probe member at section 92 is a collar member 104. Collar member 104 defines a bore 105 which is sized to allow the collar member to slide over section 92 of the probe member 80. The collar member 104 includes a pair of diametrically opposite and radially inwardly extending lugs 106 on bore 105 (seen best in FIGS. 2 and 4). The lugs 106 are slidable along and are thus removably received into the J-shaped slots 102 to removably retain collar member 104 on section 92 of probe member 80. The collar member 104 includes an annular spring seat recess 108 (best seen in FIGS. 2 and 3).

A coil compression spring 110 is received in the spring seat recess 108, and is entirely receivable into this recess if fully compressed (see FIG. 3). Further considering the collar member 104, it is seen that this collar member also includes a radially extending shape-retaining resilient portion 112. The resilient portion 112 is integral with a forwardly extending catch portion 114 having a radially inwardly extending catch tooth 114a, and also with a rearwardly extending release lever portion 116, the function of which will be clear from one of the parent patent applications referenced above. Also defined by the collar portion 104 is a diametrically opposite pair of manually-engageable ears 117, the function of which will be described below. Each ear 117 includes a small circumferentially extending tab 117a (only one of which is visible in the drawing Figures, in FIG. 4), the use of which will be noted below. The ears 117 are diametrically opposite to one another, and the portion 112 carrying catch 114 and release lever 116 is located at 90° to each of these ears in axial view.

FIGS. 2, 3, and 4 also show that the male coupling portion 20 includes a relatively thick-walled tubular sleeve member 118 defining a through bore 120. Bore 120 is sized so that the sleeve member 118 can be slidably received over the cylindrical portions 92 and 94 of the probe member 80. The sleeve member 118 is movably trapped on the probe member 80 of the male coupling portion 20 between the portion 84 and the spring 110 (i.e., between the shoulder 84a of portion 84 and the collar member 104) when this male coupling portion is assembled. At a forward end, the sleeve member 118 defines an end surface 122 which is engageable with the shoulder 84a defined by portion 84 under the influence of spring 110 (as is seen in FIG. 2). The O-rings 100a and 100b frictionally engage the sleeve member 118 so that the sleeve member is not movable axially along the probe member 80 except in response to an axial force which exceeds this frictional engagement.

On the other hand, the spring rate and pre-load of spring 110 is such that the sleeve member 118 is biased removably against the shoulder 84a defined by the enlarged portion 84 of the probe member 80. Accordingly, the sleeve member 118 closes the openings 96, as is illustrated in FIG. 2, unless moved axially along the probe member 80 by a sufficient force. As will be seen, this resilient retention of the sleeve member 118 in a position closing the openings 96 (i.e., as in FIG. 2) can be overcome, and the sleeve member 118 can be moved axially to another position (i.e., as in FIG. 3) to open the openings 96, as will be seen. For example, upon connection of the coupling portions 18 and 20, the sleeve member 118 is moved axially to open the openings 96, as will be seen.

Alternatively, the sleeve member will be opened manually by axial relative movement of the probe member 80 and a guide structure to be described even if the male coupling portion 20 is not being connected with a female coupling portion 18. In each instance, the uncovering of sleeve member 118 from openings 96 (i.e., axial movement of sleeve 118 away from shoulder 84a) is not dependent upon the male coupling portion 20 interacting with any other part of a female coupling portion. Particularly, interaction of the male coupling portion 20 with the plug member 64 of the female coupling portion 18 is not relied upon by the present invention to effect movement of sleeve member 118 and uncovering of the openings 96. A greater understanding of this aspect of the invention will be developed below.

FIG. 2 shows that in a closed first position of the sleeve member 118 on the probe member 80, the sleeve member spans and closes the openings 96. Distally and proximally of the openings 96, the O-rings 100a and 100b sealingly engage the sleeve member 118. Consequently, the fluid-flow path through the male coupling portion 20 (which is cooperatively defined by the passage 82 and openings 96) is effectively closed. As a result, when the male coupling portion 20 is disconnected from the female coupling portion 20, leakage of fluid from the conduit 14 into the ambient is prevented. Also, contamination from the ambient cannot enter the flow path of the male coupling portion 20 to cause spoilage, for example, of a fluid food product therein. On the other hand, the male coupling portion may be opened for "cleaning-in-place" (as will be described below), and in connection with opening of the male coupling portion for inspection and possible replacement of O-ring seal 100a.

In order to allow the sleeve member 118 to sealingly cooperate with the cap member 32, the sleeve member defines a radially outwardly opening groove 124. An O-ring type of sealing member 126 is received in the groove 124. As will be seen viewing FIG. 3, the O-ring 126 sealingly engages in groove 40 of cap member 32.

As is explained below, the male coupling portion 20 is especially structured to allow seal 100a to be inspected and replaced without disassembly of the coupling portion 20. Further to the above, in order to implement the possibility of opening the male coupling portion 20 without its being connected to a female coupling portion 18, a pair of diametrically opposite and radially extending lugs 131 are formed on the sleeve portion 118 distal from the end surface 122 in this embodiment of the invention. The function of these outwardly extending lugs 131 in moving the sleeve member 118 to an open second position will be further explained below.

Guide Structure 132

Viewing now FIGS. 1–5 in conjunction, and especially FIG. 4, it is seen that the male coupling portion 20 includes and is reciprocally carried in a guide structure 132. The guide structure 132 includes an annular non-circular flange portion 134 having a central circular opening 134a. Guide structure 134 also defines a pair of opposite axially-arcuate guide ways 136a and 136b, each extending from the flange portion 134 to respective part-circular termination flange parts 138a and 138b. The guide ways 136a and 136b cooperatively define a circular passage 136c for slidably receiving the male coupling probe 80 (with collar 104, spring 110, and sleeve 118), and aligning with opening 134a. Adjacent to the flange portion 134, the guide ways 136 are connected with one another by arcuate wall portions 139, which define respective axially disposed abutment surfaces 139a. The guide way 136a defines a slot 140 extending from an opening 142 on termination flange part 138a toward but short of the flange portion 134. Flange portion 134 defines a respective opening 144 aligned with the slot 140.

Use of the Coupling Portions 18 and 20

When the male coupling portion 20 is reciprocally received into the guide structure 132, as is seen in FIGS. 1–3, 5, and 6, and as is indicated by the exploded view of FIG. 4, the ears 117 are slidably received between the guide ways 136, and portion 112 along with catch 114 and release lever 116 passes through opening 142 to be reciprocable in slot 140. The guide ways 136 are resilient enough to allow tabs 117a of the ears 117 to pass the termination flange parts 138. But once the collar member 104 is received between the guide ways 136, the tabs 117a are engageable with the termination flange parts 136 to trap the male coupling part 20 in the guide structure 132. The guide ways 136 may be manually forced slightly apart to allow the tabs 117a to pass outwardly past the termination flange parts 138 to allow disassembly of the male coupling part 20 from the guide structure 132.

Figure 6:
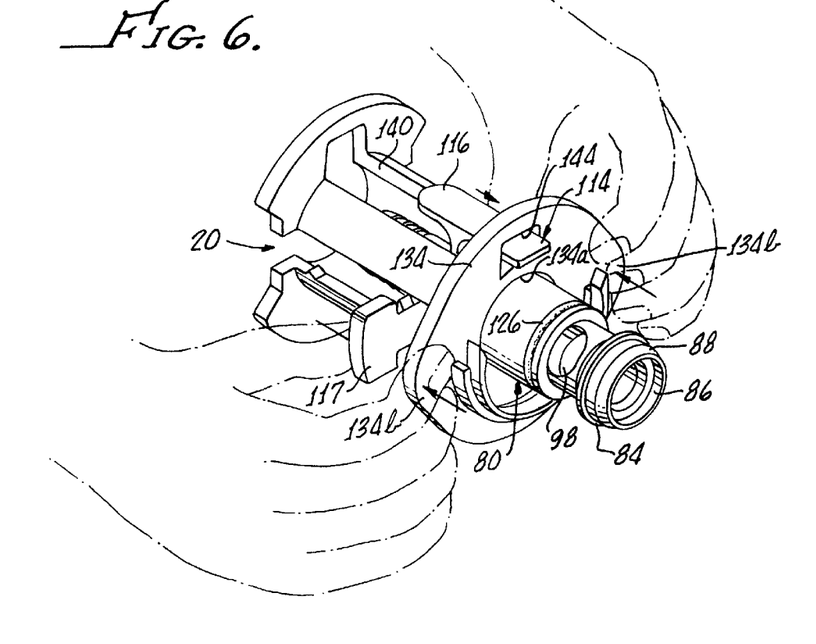
FIG. 6 provides a perspective view similar to FIG. 5 of the male coupling portion and guide structure with the male coupling portion in a manually extended and opened position relative to the guide structure.

Further, it is seen that the lugs 131 are received slidably between the guide ways 136 so that these lugs are engageable with the abutment surfaces 139a. As is seen in FIG. 6, when the guide structure 136 and male coupling portion 20 are manually grasped, and the ears 117 are forced toward flange portion 134 against the spring rate and pre-load of spring 110, the distal end portion of probe member 80 extends through the opening 134a of flange portion 134. However, because the lugs 131 of sleeve member 118 engage abutment surfaces 139a, the sleeve member is stopped in its forward motion through the opening 134a. Consequently, the probe member 80 continues in its forward motion, so that the sleeve member 118 is moved to an open second relative position.

During this application of manual squeezing force with the fingers on flange 134 and the thumbs on ears 117 (seen in FIG. 6), a pair of opposite protrusions 134b on the flange 134 and aligned axially with ears 117 provide a greater surface area for manual contact, and improve the ergonomics of the guide structure 132 in this use. Consequently, the probe member 80 continues in its forward motion under the manually-applied force, and the openings 96 on probe member 80 are revealed as sleeve member 118 is stopped by lugs 131 engaging abutment surfaces 139a. Thus, the sleeve member 118 is placed in the open second position relative to the probe member 80. In other words, the male coupling part 20 can be manually opened without connection of the male coupling portion to a female coupling portion. This opening of the male coupling portion 20 allows for cleaning and inspection of the male coupling portion, or for replacement of the O-ring seal 100a for example.

In order to allow the attachment of the guide structure 132 to the cap member 32 according to the instant embodiment of the invention, the flange portion 134 carries a semi-circular yoke 146 (best seen in FIG. 5). The yoke 146 is configured as a semi-circular axially extending wall portion 148 extending from flange portion 134 and encompassing substantially 180° concentrically with the central opening 134a and with the male coupling portion 20. The wall portion 148 includes a pair of resilient, curved, and slightly out-turned tabs 150 extending circumferentially so that the wall 148 encompasses sufficiently more than 180° to allow its "snap fit" around the cap member 32 in response to a lateral relative motion (i.e., in response to a "lateral" motion perpendicularly to the longitudinal axis of the male coupling portion 20).

Even though this lateral motion is shown in FIG. 1 as being in the vertical direction, those ordinarily skilled will recognize that this lateral motion may be in any direction around the entire circumference of the female coupling portion 18. This lateral engagement motion of the guide structure 132 onto the cap member 32 is illustrated in FIG. 1 by the short leg (151b) of the L-shaped arrowed line 151. The longer axial portion 151a of this L-shaped arrowed line 151 simply illustrates axial motion of the male coupling portion 20 to bring the wall portion 148 into alignment across the female coupling portion 18, as will be more fully understood in view of the following. The wall portion 148 defines a circumferentially extending groove 152 receiving the flange portion 78 in response to the lateral portion of this engagement motion. Flexible hose portion 14a of conduit 14 allows sufficient freedom of motion for male coupling portion 20 to allow this movement. Consequently and importantly, it is seen that the wall portion 148 embraces flange portion 78 to react axial force of the cap member 32, both away from guide structure 132, and toward this guide structure.

In view of the above, it is seen from FIG. 2 that the guide structure 132 is engaged with cap member 32 as suggested in FIG. 1 to bring the male coupling part 20) into axial alignment with the female coupling part 18. Next, the flange 134 and ears 117 are grasped between the thumb and fingers as is illustrated in FIG. 6, and manual squeezing pressure is applied to extend the male coupling part 20 at probe 80 thereof through the opening 134a and into the female coupling part 18 at bore 34. As the male coupling part 20 is extended relative to the guide structure 132, the sleeve 118 is stopped in its forward motion by engagement of the lugs 131 with the abutment surfaces 139a, just as is the case when the male coupling structure is opened for inspection (as depicted in FIG. 6). That is, the male coupling portion 20 of the present invention does not open in response to being inserted into the female coupling portion 18. The male coupling portion opens at openings 96 in response to being extended axially relative to the guide structure 132.

Turning to FIG. 3, it is seen that as the probe portion 80 of male coupling portion 20 extends in the cap member 32 and encounters the plug member 64, the ring portion 88 engages onto the inner ring portion 72 of the plug member. Subsequently, with continued inward axial movement of the probe portion 80, the outer ring portion 68 of the plug member 64 is disengaged from groove 40, and the plug member 64 is carried into the chamber 12a on the inner end of probe member 80. As this inward movement of probe member 80 takes place, the collar member 104 is also moving toward the cap 32. The catch portion 114 of collar member 104 passes through opening 144. As the probe member 80 reaches its full extension into the female coupling portion 18, the catch tooth 114a engages flange 78 on the cap portion 32 to retain the probe 80 of male coupling portion 20 fully extended despite the spring force from spring 110.

It will be seen that during this insertion of the male coupling portion 20 into the female coupling portion 18, the axial force exerted manually by the user is not applied to the box 12. That is, the user does not simply jam the male coupling portion 20 toward the female coupling portion 18 while relying on the box 12 to provide support. Instead, the axial force applied manually by the user (i.e., by squeezing with the fingers and thumbs to flange 134 and ears 117) is reacted by the yoke 146 encompassing flange 78 on cap member 32. This force reaction prevents the cap member 32 from moving away from the guide structure 132.

Further, as is taught by the parent patents referenced above, the plug member 64 engages onto the probe member 80 of the male coupling portion before becoming dislodged from the cap portion 32 at groove 40. The plug member 64 subsequently disengages from cap member 32 and is consequently carried into the chamber 12a of vessel 12, as is illustrated in FIG. 3. Further, in the coupled relative position of the male and female coupling parts (viewing FIG. 3), the openings 96 provide a fluid-flow area between conduit 14 and chamber 12a which is at least equal to that provided by the passage 82. Consequently, fluid flow in the passage 82 and in conduit 14 is not inhibited by a constriction in the couplings, as was the case with some of the conventional couplings considered above.

When the user wishes to disengage the coupling portions 18 and 20, the lever portion 116 is manually depressed slightly to allow the spring 110 to withdraw probe 80 partially out of bore 34. However, the spring 110 is not strong enough to completely disengage the coupling portions 18 and 20. To effect the complete disengagement of the coupling portions, the user grasps the ears 117 and termination flange portions 138 between thumb and fingers (shown in phantom in FIG. 5) and applies manual pinching pressure to withdraw the probe portion 80 of male coupling portion 20 from within the female coupling portion 18. During this withdrawal, the ring portion 68 of plug member 64 encounters and engages into the cap member 32. In order to insure that the plug member 64 enters the cap 32 member and is seated at ridge 70 on the ring portion 68 in groove 40 of cap member 32 before becoming disengaged from the probe member 80, a number of variables may be controlled. Among these variables are the individual stiffness of the ring portions 68, 72, and 88, and the angulations of the surfaces defining ridges 70, 76, and 89 and of grooves 40 and 74. These variables are selected in view of the teachings of the parent patents.

Consequently, a greater axial force is required to dislodge the plug member 64 from probe 80 than is required to engage plug member 64 into cap member 32. This engagement of plug member 64 into cap member 32 will occur as a "snap", accompanied by a discernable axial motion of the probe portion 80 outwardly of cap member 32. After this engagement of the plug member 64 into the cap 32 takes place, the axial force effective between the probe 80 and plug member 64 raises to a level sufficient to dislodge the plug member 64 from the end of the probe member 80.

When this force level is reached, the probe member 80 frees from the female coupling member 18 with a second "snap", and slides the rest of the way back to its position seen in FIG. 2. Subsequently, the guide structure 132 may be disengaged from the cap 32 by a lateral motion along the direction indicated by arrow 151b in FIGS. 1 and 5.

Figure 7:
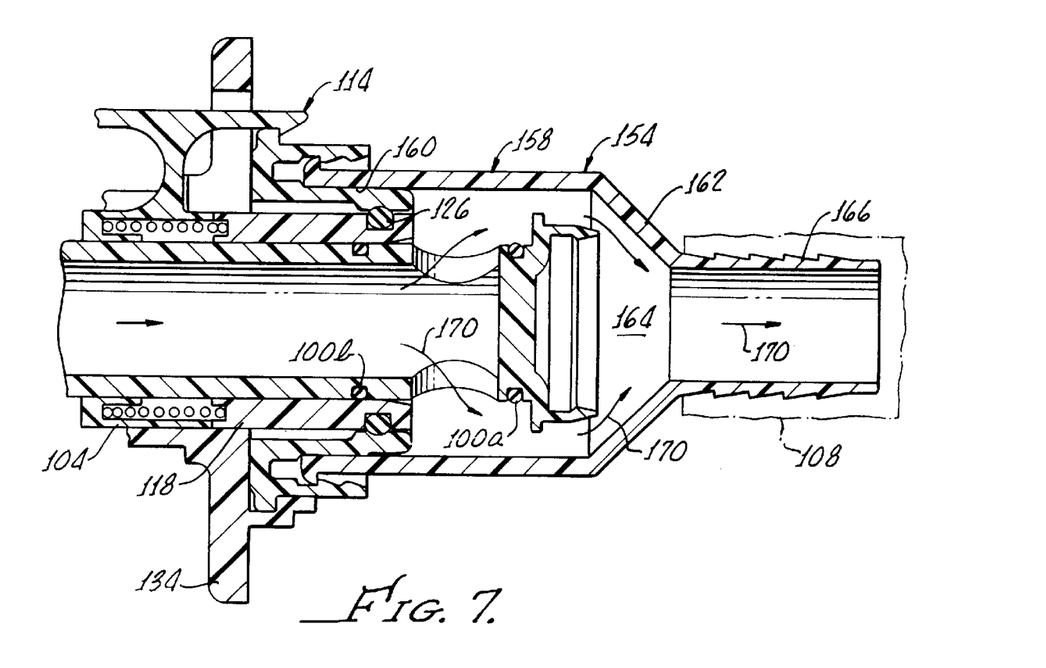
FIG. 7 is a cross sectional elevation view of a male coupling portion and guide structure embodying the present invention in cooperative engagement with a clean-in-place (CIP) fitting according to the present invention.

Viewing now FIG. 7, an advantage of the present invention can be appreciated by seeing how the male coupling portion 20 may be cleaned using a clean-in-place (CIP) fitting 154. Because the male coupling portion 20 does not rely for its opening upon an engagement with, an abutment surface on, or an interaction with any portion of the female coupling portion 18, but opens and closes in response to an axial extension and retraction of the male coupling portion relative to the guide structure 132, a simple CIP fitting 154 is possible. Further viewing FIG. 7, it is seen that the CIP fitting 154 includes a cap member 32a, which is just like the cap member 32 described above, but which in this case carries no plug member 64. The cap member 32a is snapped onto a marginal wall portion 156 of a tubular member 158. The marginal wall portion 156 defines an opening 160, which is analogous to the opening of bag fitment 24, and replicates the neck portion 52 of this bag fitment. Thus, the cap member 32a is snapped on the marginal wall portion 156 and is permanently retained. The tubular member 158 includes a tapered funnel portion 162 which is spaced from the opening 160 to provide an internal chamber 164. The funnel portion 162 leads to a hose barb section 166 of the member 158, and a flexible tube 168 is connected to the section 166. The tube 168 leads to a waste container (not shown).

In view of the above, it can be appreciated that a user of the system 10 can clean the conduit 14 and male fitting 20 by, for example, disconnecting a distal end of the conduit 14 (not shown in FIG. 1) from its connection, and providing a source of cleaning solution at this distal end of conduit 14. The cleaning solution subsequently is allowed to flow from the distal end of conduit 14 to the male fitting 20, along the passage 82, and from openings 96 into the chamber 164 of the CIP fitting 154 (as is indicated by arrows 170 in FIG. 7). The cleaning solution discharged into chamber 164 cleans the conduit 14 and male fitting 20, and is communicated to waste by the tube 168.

FIGS. 8–13 depict alternative embodiments of the invention, which are the same in all respects to the embodiment depicted in FIGS. 1–6 and described above, with the exception of the configuration of the structure used to engage the guide structure with the cap member of the female fitting. In the first two alternative embodiments, a "bayonet" type of fitting is employed, with a partial rotation of the guide structure relative to the cap member being used to effect engagement and disengagement. In the third alternative embodiment, an axial engagement dog structure is provided on the guide structure which engages and disengages with the cap member purely axially.

Figures 8, 9, 9A:
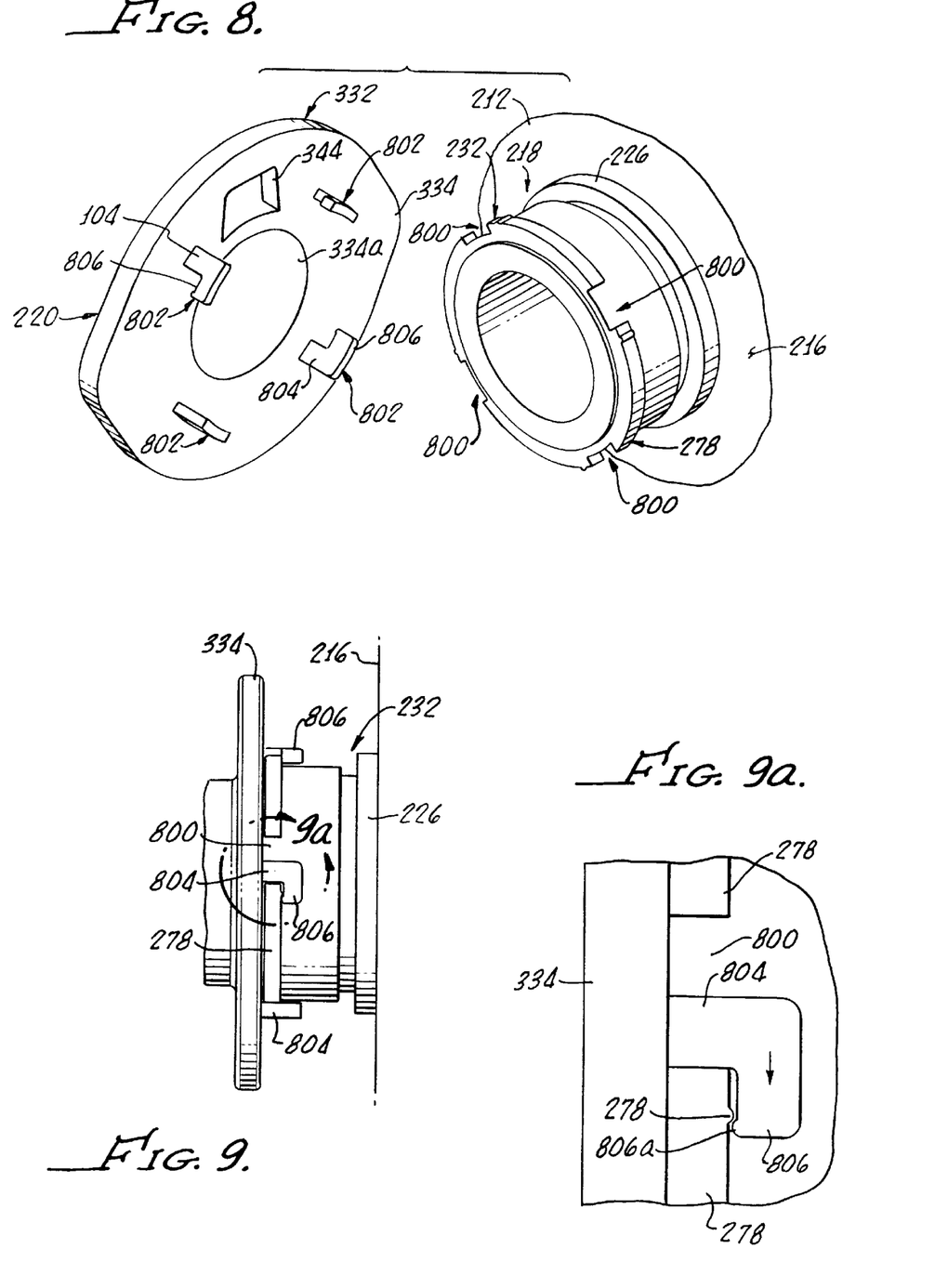
FIGS. 8 provides a fragmentary perspective view of a male coupling portion with guide structure and juxtaposed female coupling portion according to an alternative embodiment of the present invention.
FIG. 9 is a fragmentary elevation view of the female coupling portion and guide structure seen in FIG. 8 engaged with one another.
FIG. 9a is an enlarged fragmentary view of an encircled portion of FIG. 9, and shows details of the engagement of the female coupling portion and guide structure.
Figure 10:
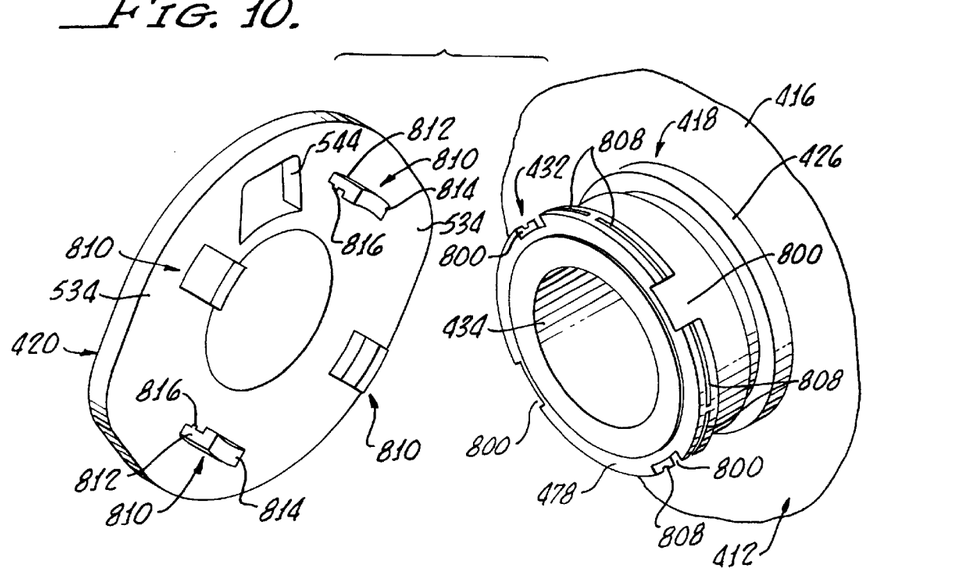
FIG. 10 provides a fragmentary perspective view similar to FIG. 8 of a male coupling portion with guide structure and a female coupling portion according to another alternative embodiment of the invention and preparatory to engagement with one another.
Figure 11:
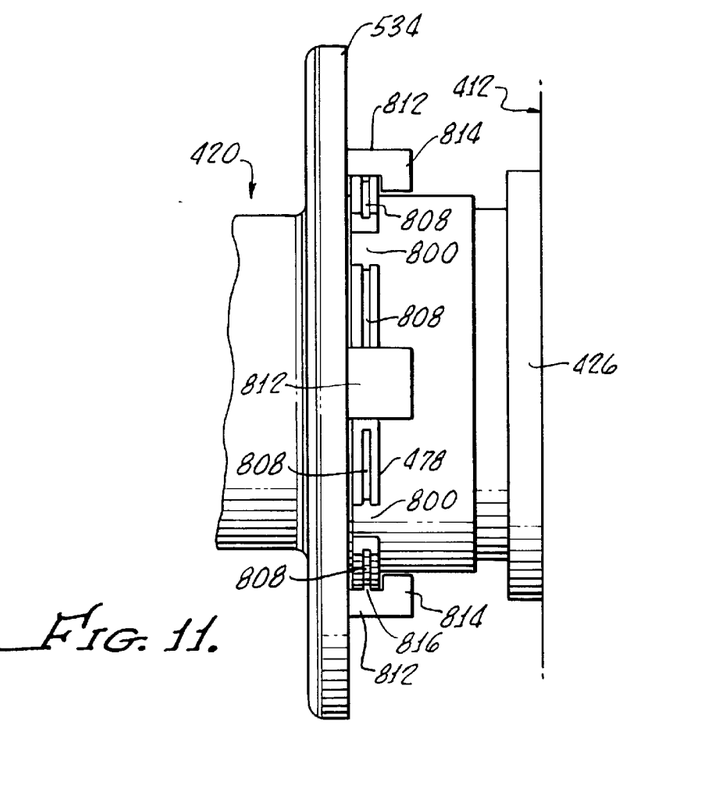
FIG. 11 is a fragmentary elevation view similar to FIG. 9 of the guide structure and female coupling portion seen in FIG. 10 engaged with one another.
Figure 12:
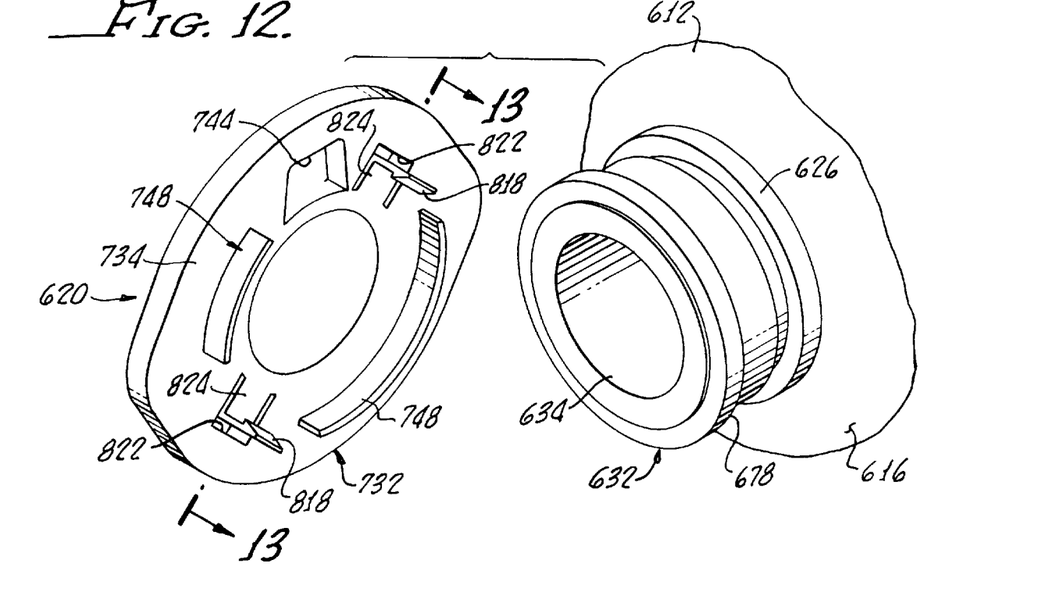
FIG. 12 provides a fragmentary perspective view of yet another alternative embodiment of a guide structure and female coupling portion according to the present invention.
Figure 13:
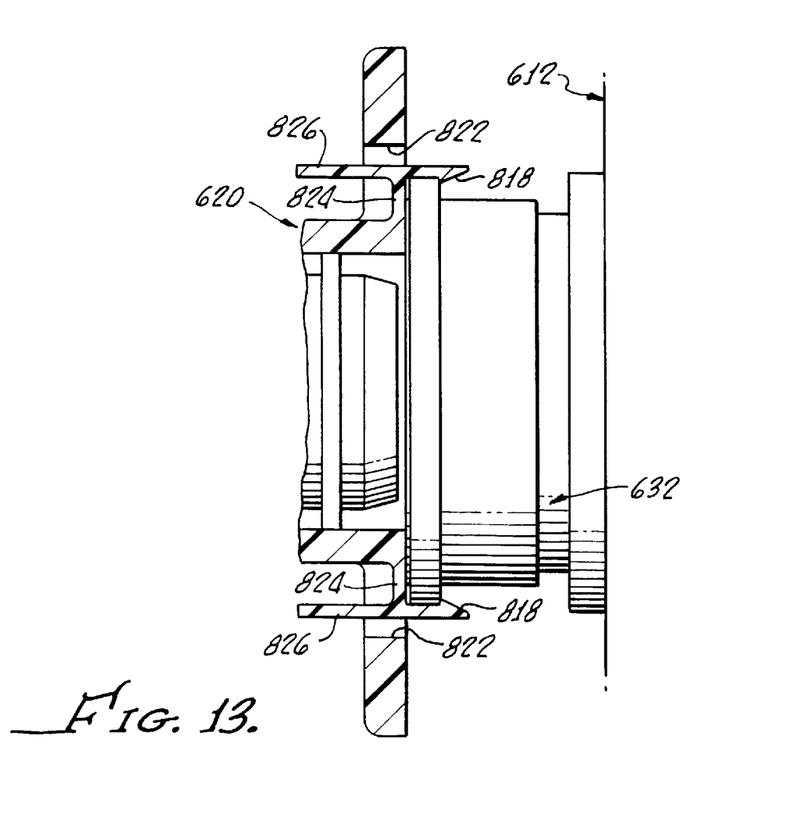
FIG. 13 is a fragmentary cross sectional view of the guide structure and female coupling portion of FIG. 12 engaged with one another.

In order to obtain reference numerals for use in describing these alternative embodiments of the invention, in each successive alternative embodiment features which are the same as or which are analogous in structure and function to features of FIGS. 1–6 are referenced using the same numeral used above, but with the reference number being increased by 200 for each successive alternative embodiment starting with an increase of 200 to avoid confusion (i.e., an increase by 200 for FIGS. 8 and 9, by 400 for FIGS. 10 and 11, and by 600 for FIGS. 12 and 13). New reference numerals start with the number 800 for these Figures.

In FIGS. 8, 9, and 9a, it is seen that the cap member 232 includes a flange portion 278 which defines four notches 800 disposed at 90° to one another. Between the notches 800, the flange portion 278 is circumferentially complete and like that of the embodiment referenced above, so that a guide structure 132 like that described above will engage this notched flange portion 278. However, the guide structure 332 depicted in FIGS. 8, 9, and 9*a* does not include a yoke like that referenced with numeral 146 above. Instead, flange portion 334 of the guide structure 332 includes a circular array of four L-shaped lugs 802, which are arrayed at 90° to one another around the opening 334*a*.

The lugs 802 each include an axially extending leg 804, and a circumferentially extending leg 806. The notches 800 of flange 278 are dimensioned to allow the lugs 802 to pass axially through so that the circumferentially extending legs 806 can each engage behind a respective portion of the flange 278 with a slight relative rotation of the guide structure 332 and cap member 232, as is depicted in FIGS. 9 and 9*a* by the rotation arrows. The lugs 802 are dimensioned to frictionally engage with the flange 278 to retain the guide structure on cap 232. Also, the lugs 802 may be configured to include an axial projection 806*a* on leg 806 extending toward the flange 278 (viewing FIG. 9*a*). Similarly, the flange portion 278 of cap 232 may include opposing axial projections 278*a*, behind which the projections 806*a* snap with sufficient relative rotation of the guide structure 332 and cap 232. Thus, the cap 232 and guide structure 332 cooperatively define a "bayonet" type of engagement structure. Just as was the case above, the guide structure 332 embraces the cap member 232 to react axial forces applied by the user of the couplings.

FIGS. 10 and 11 show an alternative embodiment of the invention in which the cap and guide structure form another species of "bayonet" type engagement structure. Viewing FIGS. 10 and 11, it is seen that the cap member 432 includes a flange portion 478 which defines four notches 800 disposed at 90° to one another. Between the notches 800 the flange 478 is circumferentially complete, so that a male coupling 20 as described above will mate with this cap 432. Similarly, the male coupling described in FIGS. 8, 9, and 9*a* will mate with the cap 432. However in this case, the flange portion 478 also defines plural circumferentially extending and radially outwardly opening grooves 808. The grooves 808 are not continuous circumferentially between notches 800, but extend a little less than half way between these notches. That is, a groove 808 extends in each circumferential direction from each notch 800 toward but not quite half way to the next notch.

In this case, the guide structure 532 includes a circular array of four L-shaped lugs 810, which are also arrayed at 90° to one another. The lugs 810 each include an axially extending leg 812, and a radially extending leg 814. Additionally, each axially extending leg 812 has a circumferentially and radially extending projection 816 spaced along this leg to align radially with the grooves 808. The notches 800 are dimensioned to allow the lugs 810 to pass axially through so that the radially extending legs 814 can each engage behind a respective portion of the flange 478. The lugs 810 are dimensioned to frictionally engage with the flange 478 to retain the guide structure 532 on cap 432. Additionally, the projections 816 are received each in a groove 808, and allow the guide structure 532 to be relatively rotated only about half way in either direction toward alignment of each lug 810 with the next circumferentially adjacent notch 800. Again, the guide structure 532 embraces the cap member 432 to react axial forces applied by the user of the couplings.

Finally, FIGS. 12 and 13 illustrate yet another alternative embodiment of the invention, in which only axial relative motion of the guide structure and cap member are needed to effect engagement. Viewing FIG. 12, it is seen that the cap member 632 includes a flange portion 678 which is circumferentially complete, just like the flange portion 78 (first embodiment). Accordingly, a guide structure 132 will engage with the cap member 632, and a guide structure 732 according to this embodiment will engage with a cap member 32. Similarly, a guide structure 732 according to this embodiment will engage with either of the cap members 232 or 432 of the embodiments illustrated in FIGS. 8–11, as is explained below.

Viewing FIGS. 12 and 13, it is seen that the guide structure 732 includes a circumferentially interrupted circular wall portion 748, and two catch dogs 818 interdigitated with portions of this wall. The catch dogs 818 are oriented at 180° to one another. Each catch dog 818 is carried in a respective opening 822 in the flange portion 734 by a respective resilient integral mount element 824. On the other side of the flange portion 734 from that seen in FIG. 12, each catch dog 818 includes an axially projecting release lever portion 826.

In order to use the embodiment depicted in FIGS. 12 and 13, the user need only push the guide structure 732 onto the cap member 632, while providing enough support to the cap member to allow this axial force. It will be understood that the amount of axial engagement force required can be decreased by the user squeezing together the lever portions 826 as the guide structure 732 is moved toward cap 632. After the guide structure 732 obtains a position in which the catch dogs 818 are behind flange portion 678, release of the lever portions 826 allows the catch dogs 818 to engage the flange 678. In most cases, however, the box 612 would provide a sufficient support for the bag member and cap member 632 so that the guide structure 732 is simply pushed axially onto the cap 632. Subsequently, the male coupling part may be engaged into and disengaged from the female coupling part just like the other embodiments described above. After the male coupling part is disengaged from the female coupling part as described above, the guide structure 732 is removed from the cap member 632 by manually squeezing the release lever portions 826, pivoting the catch dogs 818 out of engagement with the flange portion 678, and allowing axial removal of the guide structure from the cap 632.

While the present invention has been depicted, described, and is defined by reference to a particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. For example, the present coupling portions can be used with fluids other than food products. These coupling portions could be used with liquids such as chemicals. Photographic chemicals are an example of a liquid other than a food product with which the present coupling portions could be used.

Also, the present coupling invention can be used with other types of vessels in addition to those depicted, described, or referred to specifically herein. For example, bag type vessels can be used with the present coupling portions even if the bag is not disposed in a box. The present coupling portions have a special advantage is such a use because the male and female coupling portions can be engaged with one another in response to a lateral relative movement and with little applied force. Thereafter, coupling of the male and female coupling structures requires the application of manual pinching forces with the thumbs and fingers, which forces are reacted by the guide structure embracing the cap portion. Consequently, only a very low initial engagement force is applied to the female coupling portion to possibly stress the bag as the guide structure is engaged onto the cap. Afterwards, the bag is not exposed to any of the axial force necessary to effect coupling or decoupling of the coupling portions.

The present coupling portions can also be used to effect fluid communication between a pair of conduits or a pair of vessels, for example, instead of just between a vessel and a conduit as depicted. Thus, it is appreciated that the depicted and described preferred embodiment of the invention is exemplary only, and is not exhaustive of the scope of the invention. Consequently, the invention is intended to be limited only by the spirit and scope of the appended claims, giving full cognizance to equivalents in all respects.

We claim:

1. A fluid coupling structure having a female coupling portion and a male coupling portion each defining a respective fluid flow path, said coupling portions being removably engageable with one another to communicate the respective fluid flow paths with one another, each coupling portion including an individual valve element having a respective closed first position, said valve elements moving to respective open second positions when said coupling portions are engaged together, said coupling structure comprising: a guide structure reciprocably carrying said male coupling portion, said guide structure including support means for supportingly and releasably engaging onto said female coupling portion, and said guide structure further including means for guiding said male coupling portion in reciprocation in a first direction into said female coupling portion and in an opposite second direction from said female coupling portion, said guide structure and male coupling portion including cooperating means for opening the respective valve member of said male coupling portion in response to reciprocation of said male coupling portion relative to said guide structure in said first direction.

2. The coupling structure of claim 1 wherein said support means for supporting on said female coupling portion includes said guide structure having a flange part defining an opening through which projects said male coupling portion toward engagement with a female coupling portion, said flange part carrying engagement means for engaging onto a circular flange part of said female coupling portion, said engagement means including a structure selected from the group comprised of: a yoke configured to engage laterally onto said circular flange part, an array of L-shaped lugs each having a circumferentially extending leg engaging behind said circular flange part, an array of L-shaped lugs each having a radially extending leg engaging behind said circular flange part, and a circumferentially interrupted circular wall interdigitated with a pair of catch dogs each having a catch tooth radially engageable with said circular flange part.

3. The coupling structure of claim 2 wherein said guiding means for guiding said male coupling portion in reciprocation into and from said female coupling portion comprises a pair of opposite axially-arcuate guide ways each extending from said flange part and cooperatively defining a circular passage slidably receiving said male coupling portion.

4. The coupling structure of claim 2 wherein said cooperating means for opening the respective valve member of said male coupling portion in response to reciprocation of said male coupling portion relative to said guide structure in a direction toward engagement with a female coupling portion includes said individual valve element of said male coupling portion including a sleeve member which is slidably carried on a probe member, said probe member defining said respective fluid flow path of said male coupling portion and also defining an aperture opening outwardly thereon, said sleeve member in said closed first position spanning and closing said aperture, said sleeve member including a radially outwardly extending lug engageable with said flange part of said guide structure upon forward reciprocation of said male coupling portion to slide said sleeve member relative to said probe member to said open second position.

5. The coupling structure of claim 4 wherein said male coupling portion further includes a collar member carried upon said probe member, said collar member including a radially outwardly extending manually-engageable ear in juxtaposition to said flange part of said guide structure, whereby said flange part of said guide structure and said ear of said male coupling portion may be manually actuated with a squeezing motion applied with the fingers and thumb to move said male coupling portion axially of said guide structure as though it were moving toward engagement with a female coupling portion.

6. A male fluid coupling device for use in conjunction with a female fluid coupling device having a fluid flow path, said male fluid coupling device defining a respective fluid flow path, said male and female fluid coupling devices being engageable with one another in response to relative movement to move the male coupling device in a first direction to communicate the respective fluid flow paths with another and being disengageable from one another in response to relative movement in a opposite second direction, a guide structure reciprocably carrying said male fluid coupling device and which supportingly engages upon the female coupling device, said male coupling device also comprising a valve element having a closed first position and relatively moving to an open second position in response to reciprocation of said male coupling device relative to said guide structure in said first direction, said valve element and said guide structure defining cooperating abutment means engaging to move said valve element to said second position in response to relative movement of said male coupling device in said first direction.

7. The male fluid coupling device according to claim 6 further including an elongate probe portion defining a part of said fluid flow path, and said probe portion also defining an opening outwardly from said fluid flow path, said valve element including a sleeve member reciprocably carried on said probe portion, said sleeve member in said closed first position thereof spanning and closing said opening, said sleeve member being movable to said open second position in which said sleeve member is at least in part clear of said opening to allow communication of fluid via said opening, and said cooperating abutment means including said sleeve member having means for abutting against said guide structure and stopping relative movement of said sleeve member as said male coupling portion is moved forwardly relative to said guide structure in said first direction, whereby said probe portion of said male coupling device continues forward movement after stopping of said sleeve member to advance said probe portion opening from within said sleeve member and relatively moving said sleeve member at least in part clear of said opening.

8. A male fluid coupling structure; the male fluid coupling structure being configured for removable coupling with a female fluid coupling structure, which female fluid coupling structure is in fluid-flow communication with a vessel, the male fluid coupling structure being in fluid-flow communication with a conduit and being removably supportable upon and coupling with the female fluid coupling structure to effect fluid-flow communication between the vessel and the conduit substantially without transmission of coupling and de-coupling forces to the vessel; the male and female fluid coupling structures being disengageable to both discontinue the fluid-flow communication between the vessel and conduit and to also close communication between the conduit and ambient; said male fluid coupling structure comprising:

a male fluid coupling assembly including:
an elongate probe member defining a passage for fluid-flow communication with a conduit, said probe member defining an opening from said passage outwardly on said probe member;
a sleeve-like valve member carried on said probe member for movement between a first position in which said valve member spans and closes said opening, and a second position in which said sleeve-like valve member is at least in part clear of said opening to allow fluid communication between said passage and the ambient surrounding said probe member at said opening; and
resilient means yieldably biasing said sleeve-like valve member to said first position;
a guide structure; said guide structure defining:
engaging means for supporting on the female fluid coupling structure, and for reciprocally carrying said male fluid coupling assembly for axial relative movement, said male fluid coupling assembly being axially movable relative to said guide structure between a first relative position substantially within said guide structure with said sleeve-like valve member in said first position, and a second relative position of axial advancement at least partially outside of said guide structure and in which said sleeve-like valve member is moved to said second relative position, said male fluid coupling assembly and said guide structure defining cooperating means for relatively moving said sleeve-like valve member to said second position in response to movement of said male fluid coupling assembly from said first relative position to said second relative position.

9. A two-part fluid coupling structure having a female coupling part for fluid-flow communication with a vessel, and a male coupling part for fluid-flow communication with a conduit, said coupling parts being mutually engageable to effect fluid-flow communication between said vessel and said conduit, and being disengageable to both discontinue said fluid-flow communication and also to mutually close fluid-flow communication between ambient and each of said vessel and conduit; said two-part coupling structure comprising:

said female coupling part having:
a female cap member defining a through bore communicating between ambient and said vessel, and a radially inwardly opening circumferential groove on said through bore spaced outwardly of said vessel along said through bore;
a disk-like plug member having a wall portion for spanning and closing said through bore of said cap member, said plug member including a circumferential first ring portion which is sealingly receivable forcefully into said through bore of said cap member in an axial direction outwardly of said vessel, and said first ring portion radially outwardly defining a circumferential ridge receivable into said circumferential groove of said cap member to lock said plug member into sealing relation therewith, said plug member further defining a radially inner second ring portion spaced from said first ring portion and like disposed, said second ring portion further defining an outer radially outwardly opening circumferential groove;

said male coupling part having:
an elongate probe member defining a blind axial passage for fluid-flow communication with said conduit and a wall portion closing said axial passage adjacent a forward end of said probe member, said probe member defining a stepped outer diameter with an enlarged-diameter forward flange portion including a forwardly extending third ring portion, said third ring portion defining a radially inwardly protruding annular rib by the cooperation of oppositely axially extending angulated surface portions, said third ring portion being received between said first and said second ring portions of said plug member to engage said rib of said third ring portion into said groove of said second ring portion, and said flange portion also cooperating with a smaller-diameter portion of said probe member to define a rearwardly-disposed shoulder, said probe member defining a lateral aperture opening from said blind passage outwardly on said smaller-diameter portion rearwardly of and adjacent to said shoulder;
a sleeve member carried slidably on said smaller-diameter portion of said probe member between a first position across and closing said lateral aperture and a second position at least partially rearwardly of and opening said lateral aperture, said sleeve member having a circumferential axially-disposed forward end edge surface engageable in said first position of said sleeve member with said shoulder of said probe member flange portion, and further having a radially outwardly extending lug portion at a rear end thereof opposite to said forward end edge, said sleeve member also outwardly carrying resilient sealing means for sealingly engaging retainingly into said circumferential groove of said cap member;
a guide structure reciprocably carrying said probe member and said sleeve member, said guide structure including a forward flange portion having a central opening therein, and means for engaging supportingly upon said cap member with said central opening in alignment with said through bore of said cap member, means for defining a guide way for said probe and sleeve member to allow reciprocation thereof via said central opening into and from said through bore of said female coupling part, said guide structure defining an abutment surface engaged by said lug of said sleeve member to stop relative motion thereof upon a certain advancement of said male coupling part probe member relative to said forward flange portion, said probe member of said male coupling part continuing in forward advancement relative to said forward flange portion to move relative to said sleeve member to said second position thereof with said lateral aperture at least partially uncovered.

10. A two-part coupling structure for manual engagement and disengagement, said coupling structure having a female coupling part and a male coupling part each with a respective fluid-flow path therein, said coupling parts being supportingly engageable with one another to mutually align axially with one another and to supportingly react manually-applied axial connection and disconnection forces, and said coupling parts establishing fluid-flow communication of said respective fluid-flow paths in response to axial relative movement; said two-part coupling structure comprising:

said female coupling part including:

a female cap member having a through bore defining a respective fluid-flow path, said cap member having a radially outwardly extending flange portion circumscribing said through bore;

a disk-like plug member having a wall portion for spanning said through bore of said cap member to close said fluid-flow path of said cap member;

said cap member and said plug member defining first cooperating means for both sealingly engaging one another to close said fluid-flow path of the cap member with said wall portion of said plug member and for removably attaching together and detaching from one another in response to respective oppositely-directed first and second axial forces;

said male coupling part including:

an elongate probe member having an axial passage defining said respective fluid-flow path, and a wall portion closing said axial passage adjacent a forward end of said probe member, said probe member defining a stepped outer diameter with an enlarged-diameter forward flange portion cooperating with a smaller-diameter portion of said probe member to define a rearwardly-disposed shoulder, said probe member defining a lateral aperture opening outwardly from said axial passage on said smaller-diameter portion rearwardly of and adjacent to said shoulder;

a sleeve member carried slidably on said smaller-diameter portion of said probe member between a first position across and closing said lateral aperture and a second position at least partially rearwardly of and opening said lateral aperture, said sleeve member having an elongate cylindrical outer surface portion of a size to be received closely into said through bore of said cap member, said sleeve member having a forwardly-disposed circumferential end edge surface engageable in said first position of said sleeve member with said rearwardly-disposed shoulder of said probe member;

said probe member and said plug member defining cooperating means for removably attaching together and detaching from one another in response to respective oppositely-directed third and fourth axial forces, which third axial attaching force is less than said second axial force so that upon insertion of said male coupling part into said female coupling part said probe member first sequentially attaches with said plug member and then disengages said plug member from said cap member for movement of said plug member inwardly of said female coupling part along with said inserting probe member; and a guide structure reciprocably carrying said male coupling part and including means for supportingly engaging with said cap member both to react said manually-applied axial forces and to align said male coupling part with said through bore, said guide structure and said sleeve member including cooperating means for stopping relative movement of said sleeve member toward said cap member while allowing said probe member to continue this forward relative motion, thus relatively moving said sleeve member from said first position to said second position as said male coupling part is advanced by manually-applied force into said female coupling part.

11. The two-part coupling structure of claim 10 wherein said male coupling part further includes a collar member defining a through bore, said collar member slidably and removably passing over a portion of said probe member, said collar member including means for releasably engaging on said probe member and also including a pair of diametrically opposite and radially outwardly extending ears, each of said opposite ears at an outer portion thereof having a manually-engageable portion for allowing application of manual force to advance said male coupling portion relative to said guide structure.

12. The two-part coupling structure of claim 11 wherein said collar member defines a spring seat surface, said sleeve member also defining a spring seat surface, and a coil compression spring extending between said spring seat surfaces outwardly of said probe member to yieldably bias said sleeve member to said closed first position.

* * * * *